(12) United States Patent
Takahashi et al.

(10) Patent No.: US 11,124,189 B2
(45) Date of Patent: Sep. 21, 2021

(54) TRAVEL CONTROL DEVICE, VEHICLE, AND TRAVEL CONTROL METHOD

(71) Applicant: Isuzu Motors Limited, Tokyo (JP)

(72) Inventors: Naoki Takahashi, Chigasaki (JP); Masaichi Takahashi, Yokohama (JP)

(73) Assignee: Isuzu Motors Limited, Tokyo (JP)

( * ) Notice: Subject to any disclaimer, the term of this patent is extended or adjusted under 35 U.S.C. 154(b) by 108 days.

(21) Appl. No.: 16/496,435

(22) PCT Filed: Mar. 16, 2018

(86) PCT No.: PCT/JP2018/010560
§ 371 (c)(1),
(2) Date: Sep. 22, 2019

(87) PCT Pub. No.: WO2018/173966
PCT Pub. Date: Sep. 27, 2018

(65) Prior Publication Data
US 2020/0017107 A1    Jan. 16, 2020

(30) Foreign Application Priority Data
Mar. 23, 2017 (JP) .............................. JP2017-057819

(51) Int. Cl.
*B60W 30/16* (2020.01)

(52) U.S. Cl.
CPC ....... *B60W 30/162* (2013.01); *B60W 2520/10* (2013.01); *B60W 2554/801* (2020.02); *B60W 2720/106* (2013.01); *B60W 2754/30* (2020.02)

(58) Field of Classification Search
CPC ......... B60W 30/162; B60W 2554/801; B60W 2754/30; B60W 2520/10;
(Continued)

(56) References Cited

U.S. PATENT DOCUMENTS

2016/0229402 A1* 8/2016 Morita ............. G08G 1/096758
2018/0354517 A1* 12/2018 Banno ................... B60W 50/14

FOREIGN PATENT DOCUMENTS

| JP | 05-156977 | 6/1993 |
| JP | 05-221253 | 8/1993 |

(Continued)

OTHER PUBLICATIONS

English_Translation_JP2002211270A (Year: 2002).*
(Continued)

*Primary Examiner* — Peter D Nolan
*Assistant Examiner* — Ashley L Redhead, Jr.

(57) ABSTRACT

Provided are a travel control device that enhance safety while enabling smooth overtaking of a vehicle from tracking travel. This travel control device is equipped with a direction indication determination unit, a travel control unit that performs control to switch travel of the vehicle between tracking travel whereby the vehicle is made to travel by tracking the preceding vehicle and propulsion travel whereby the vehicle is made to travel so as to match the speed of the vehicle to a target speed, and an inter-vehicle distance detection unit that detects the inter-vehicle distance in tracking travel between the vehicle and the preceding vehicle. In cases in which, during tracking travel, it is determined that direction indication of vehicle has been activated and the inter-vehicle distance exceeds a prescribed distance, the travel control unit switches travel of the vehicle from tracking travel to propulsion travel.

6 Claims, 5 Drawing Sheets (58) Field of Classification Search
CPC ....... B60W 2720/106; B60W 2540/20; B60W 2554/802; B60W 2554/804; B60W 30/16; B60W 30/143; B60W 30/18163; B60K 2310/266; B60K 2310/248
See application file for complete search history.

(56) References Cited

FOREIGN PATENT DOCUMENTS

| | | |
|---|---|---|
| JP | 2002-211270 | 7/2002 |
| JP | 2004-017895 | 1/2004 |
| JP | 4432270 B2 * | 3/2010 |
| JP | 2016-144967 | 8/2016 |
| JP | 2017-024479 | 2/2017 |
| WO | WO 2018/173966 | 9/2018 |

OTHER PUBLICATIONS

English_Translation_JP4432270B2 (Year: 2002).*
International Search Report and the Written Opinion dated Jun. 12, 2018 From the International Searching Authority Re. Application No. PCT/JP2018/010560 and Its Translation of Search Report Into English. (9 Pages).

* cited by examiner

TRAVEL CONTROL DEVICE, VEHICLE, AND TRAVEL CONTROL METHOD

RELATED APPLICATIONS

This application is a National Phase of PCT Patent Application No. PCT/JP2018/010560 having International filing date of Mar. 16, 2018, which claims the benefit of priority of Japanese Patent Application No. 2017-057819 filed on Mar. 23, 2017. The contents of the above applications are all incorporated by reference as if fully set forth herein in their entirety.

FIELD AND BACKGROUND OF THE INVENTION

This disclosure relates to a travel control device for controlling the travel of a vehicle, a vehicle, and a travelling control method.

Conventionally, there is known a travel control device which controls the automatic traveling of a vehicle (traveling without requiring the driver's operation).

For example, Patent Literature 1 discloses a travel control device that performs a control in which the vehicle velocity is maintained at a set vehicle velocity (hereinafter referred to as the target vehicle velocity) to run the vehicle (driving travel).

For example, PTL 2 discloses a travel control device for performing a control (Adaptive Cruise Control: ACC) for causing a vehicle to travel (follow-up travel) such that an inter-vehicle distance between a vehicle and a preceding vehicle traveling in front of the vehicle is maintained at a predetermined distance (hereinafter referred to as a target inter-vehicle distance).

CITATION LIST

Patent Literature

PTL 1: Japanese Patent Application Laid-Open No. 2017-024479

PTL 2: Japanese Patent Application Laid-Open No. 2016-144967

SUMMARY OF THE INVENTION

Technical Problem

In the meantime, there is a case where the vehicle is accelerated to pass preceding vehicle during the follow-up travel. When the vehicle is accelerated, the inter-vehicle distance becomes narrower than the target inter-vehicle distance, so that the vehicle is braked. As a result, there is a problem in that the vehicle is prevented from being accelerated, thereby making it difficult to smoothly take over a smooth passing.

In addition, when the inter-vehicle distance is narrow, it is difficult to pass the preceding vehicle in order to improve the safety of traveling.

An object of this disclosure is to provide a travel control device, a vehicle, and a travel control method capable of smoothly passing from a follow-up travel while improving safety.

Solution to Problem

A travel control device of the present disclosure includes:

a direction indication determination section that determines whether or not a direction indication by a direction indicator of a vehicle is activated;

a travel control section that performs a switching control for traveling of the vehicle between a follow-up travel and a driving travel, the follow-up travel causing the vehicle to follow a preceding vehicle traveling in front of the vehicle and the driving travel causing the vehicle to travel so as to keep the velocity of the vehicle to a target vehicle velocity; and an inter-vehicle distance detecting section that detects an inter-vehicle distance between the vehicle and the preceding vehicle during the follow-up travel, in which the travel control section switches traveling of the vehicle from the follow-up travel to the driving travel when the vehicle satisfies a first condition that it is determined that the direction indication is activated and the inter-vehicle distance exceeds a predetermined distance during the follow-up travel.

A vehicle of the present disclosure includes the travel control device described above.

A travel control method of the present disclosure includes:

determining whether or not direction indication by a direction indicator of a vehicle is activated;

performing a switching control for traveling of the vehicle between a follow-up travel and a driving travel, the follow-up travel causing the vehicle to follow a preceding vehicle traveling in front of the vehicle and the driving travel causing the vehicle to travel so as to keep the velocity of the vehicle to a target vehicle velocity;

detecting an inter-vehicle distance between the vehicle and the preceding vehicle; and switching traveling of the vehicle from the follow-up travel to the driving travel when it is determined that the direction indication is activated and the inter-vehicle distance exceeds a predetermined distance during the follow-up travel.

Advantageous Effects of Invention

According to this disclosure, it is possible to smoothly pass from a follow-up travel while enhancing safety.

DESCRIPTION OF SPECIFIC EMBODIMENTS OF THE INVENTION

Hereinafter, embodiments of this disclosure will be described in detail with reference to the drawings.

<Example of Configuration of Vehicle 1>

Figure 1:
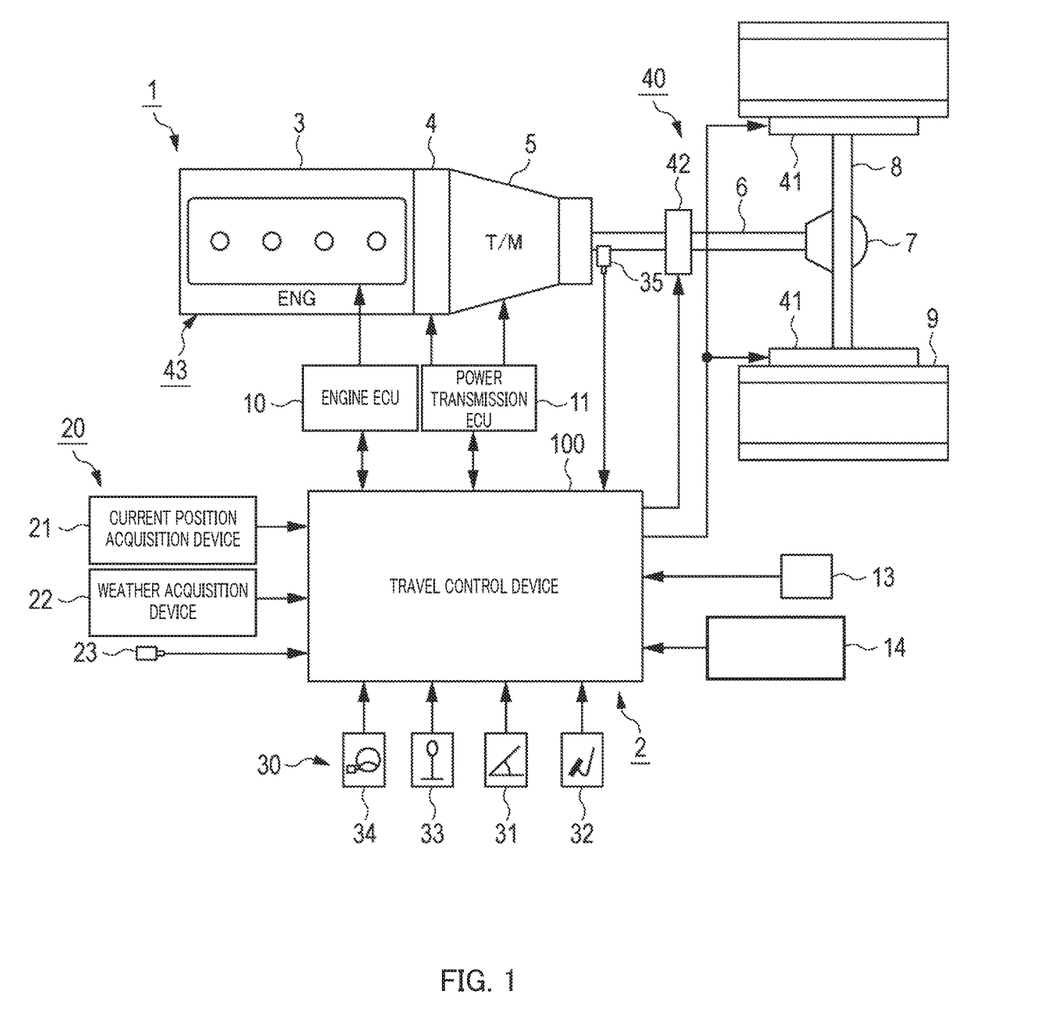
FIG. 1 is a block diagram illustrating an example of a configuration of a vehicle including a travel control device according to an embodiment of this disclosure.

First, the configuration of vehicle including travel control device 100 according to the present embodiment will be described. FIG. 1 is a block diagram illustrating an example of a configuration of vehicle including travel control device 100 according to the present embodiment. Hereinafter, a description will be given focusing on a portion related to travel control device 100.

Vehicle 1 is a vehicle capable of switching between driving travel and follow-up travel. The driving travel (also referred to as constant velocity traveling) is a travel in which vehicle 1 is travelled to drive wheels 9 by a drive system, described later, to maintain the target vehicle velocity predetermined in advance. The follow-up travel is a travel in which vehicle 1 is traveled so as to keep the inter-vehicle distance between vehicle 1 and the preceding vehicle traveling in front of vehicle 1 at the target inter-vehicle distance.

Vehicle 1 illustrated in FIG. 1 is a large vehicle such as a truck on which a series 6 cylinder diesel engine is mounted, for example.

As illustrated in FIG. 1, vehicle 1 includes engine 3, clutch 4, transmission 5, propulsion shaft (propeller shaft) 6, differential device (differential gear) 7, drive shaft 8, and wheels 9 as a configuration of a drive system for traveling the vehicle.

Power of engine 3 is transmitted to transmission 5 via clutch 4, and the power transmitted to transmission 5 is further transmitted to wheels 9 via propulsion shaft 6, differential device 7, and drive shaft 8. Thus, power of engine 3 is transmitted to wheels 9, and vehicle 1 travels.

Further, vehicle 1 has braking device 40 as a structure of a braking system for stopping the vehicle. Braking device 40 includes foot brake 41 which imparts a resistance force to wheels 9, retarder 42 which applies a resistance force to propulsion shaft 6, and an auxiliary brake 43 such as an exhaust brake which applies a load to the engine.

Further, vehicle 1 has automatic traveling device 2 as a configuration of a control system for controlling travel of vehicle 1. Automatic traveling device 2 is a device for causing vehicle 1 to perform an automatic traveling by controlling the output of engine 3, the disengagement of clutch 4 and the shift of transmission 5, and includes a plurality of control devices.

Specifically, automatic traveling device 2 includes engine ECU (engine control device) 10, power transmission ECU (power transmission control device) 11, target vehicle velocity setting device 13, increase/decrease value setting device 14, road information acquisition device 20, vehicle information acquisition device 30, and travel control device 100.

Engine ECU 10, power transmission ECU 11 and travel control device 100 are connected to each other by an on-vehicle network, so that necessary data and control signals can be transmitted to and received from each other.

Engine ECU 10 controls the output of engine 3. Power transmission ECU 11 controls the disengagement of clutch 4 and the shift of transmission 5.

Target vehicle velocity setting device 13 sets target vehicle velocity during the automatic traveling of vehicle 1 to travel control device 100.

Increase/decrease value setting device 14 sets velocity decrease value and velocity increase value at the automatic traveling of vehicle 1 in travel control device 100. These values are parameters used for automatic travel of vehicle 1.

Target vehicle velocity setting device 13 and increase/decrease value setting device 14 include, for example, an information input interface such as a display with a touch panel disposed on a dashboard (not illustrated) of a driver's seat, and receive the setting of the parameters from the driver. Target vehicle velocity, velocity decrease value, and velocity increase value are referred to as "setting information" as appropriate.

Road information acquisition device 20 acquires road information indicating the road condition and the current position of vehicle 1, and outputs the road information to travel control device 100. For example, road information acquisition device 20 includes current position acquisition device 21 which is a receiver of a satellite positioning system (GPS), weather acquisition device 22 which acquires weather during traveling, and ambient sensor 23 which detects a distance to a vehicle traveling around vehicle 1 (such as a preceding vehicle and a parallel traveling vehicle) and a vehicle velocity difference.

Figure 2:
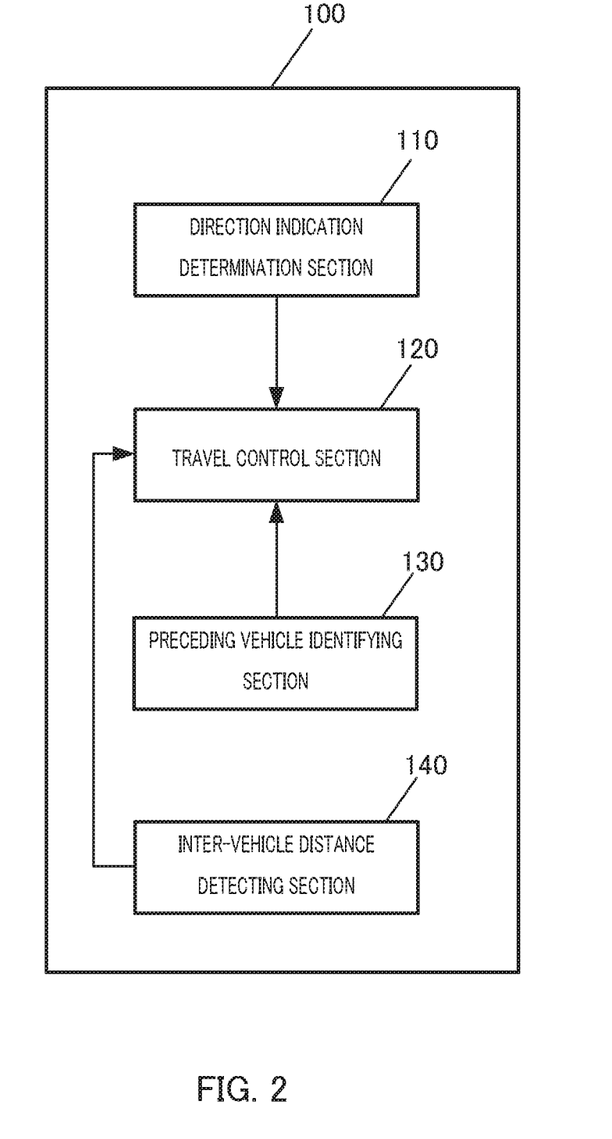
FIG. 2 is a block diagram illustrating an example of a configuration of a travel control device according to the present embodiment.

It is preferable that the road information includes road gradient information indicating the gradient of each point of the road, in consideration of the traveling schedule generated by travel control device 100 (travel control section 120 in FIG. 2). The road gradient information is data describing the altitude (road altitude) of the corresponding positions in association with the horizontal positions (latitude/longitude information or the like) of each road.

Vehicle information acquisition device 30 acquires vehicle information indicating the operation contents of the driver and the state of vehicle 1 and outputs the vehicle information to travel control device 100. For example, vehicle information acquisition device 30 includes: accelerator sensor 31 configured to detect a depression amount of an accelerator pedal; brake switch 32 for detecting whether or not a brake pedal is depressed; shift lever 33; turn signal switch 34; and vehicle velocity sensor 35 for detecting the velocity of vehicle 1.

Travel control device 100 generates a traveling schedule including driving travel and follow-up travel based on the setting information, road information, and vehicle information described above.

Then, travel control device 100 controls each part of vehicle 1 so that vehicle 1 travels in accordance with the generated traveling schedule.

Although not illustrated, engine ECU 10, power transmission ECU 11, and travel control device 100 include, for example, a Central Processing Unit (CPU), a storage medium such as a Read Only Memory (ROM) storing a control program, a working memory such as a Random Access Memory (RAM), and a communication circuit, respectively. In this case, for example, the function of each part described above constituting travel control device 100 is realized by the CPU executing the control program. Note that all or part of engine ECU 10, power transmission ECU 11, and travel control device 100 may be integrally formed.

<Configuration Example of Travel Control Device 100>

Next, the configuration of travel control device 100 will be described with reference to FIG. 2. FIG. 2 is a block diagram showing an example of the configuration of travel control device 100.

As illustrated in FIG. 2, travel control device 100 includes direction indication determination section 110, travel control section 120, preceding vehicle identifying section 130, and inter-vehicle distance detecting section 140.

Next, direction indication determination section 110 will be described.

Direction indication determination section 110 determines whether or not a direction indicator (not illustrated) is operating based on a detection signal from a direction indication operation switch (not illustrated), and outputs a determination result to travel control section 120.

Preceding vehicle identifying section 130 detects the presence or absence of a preceding vehicle traveling in front of vehicle 1 according to a detection signal from peripheral sensor 23 (identification and non-identification of the preceding vehicle), and outputs a detection result to travel control section 120. Further, the preceding vehicle identifying section 130 preferably detects whether or not the preceding vehicle is present in the image recognition processing by using image data of the vehicle-mounted camera.

Inter-vehicle distance detecting section 140 detects an inter-vehicle distance between vehicle 1 and the preceding vehicle based on the detection signal from peripheral sensor 23, and outputs the detection result to travel control section 120. The inter-vehicle distance detecting section 140, more preferably, uses both a vehicle-mounted camera and vehicle mounted radar. Inter-vehicle distance detecting section 140 detects the two-dimensional position of the preceding vehicle by the image recognition processing by using, for example, the image data of the vehicle-mounted camera. Inter-vehicle distance detecting section 140 then detects an inter-vehicle distance between the vehicle and the preceding vehicle by using a vehicle mounted radar.

travel control section 120 performs a switching control for traveling of vehicle 1 between the follow-up travel and the driving travel.

travel control section 120 performs a switching control for traveling of vehicle 1 based on information about the presence or absence of the preceding vehicle, an inter-vehicle distance between the vehicle and the preceding vehicle, and the like.

Figure 3:
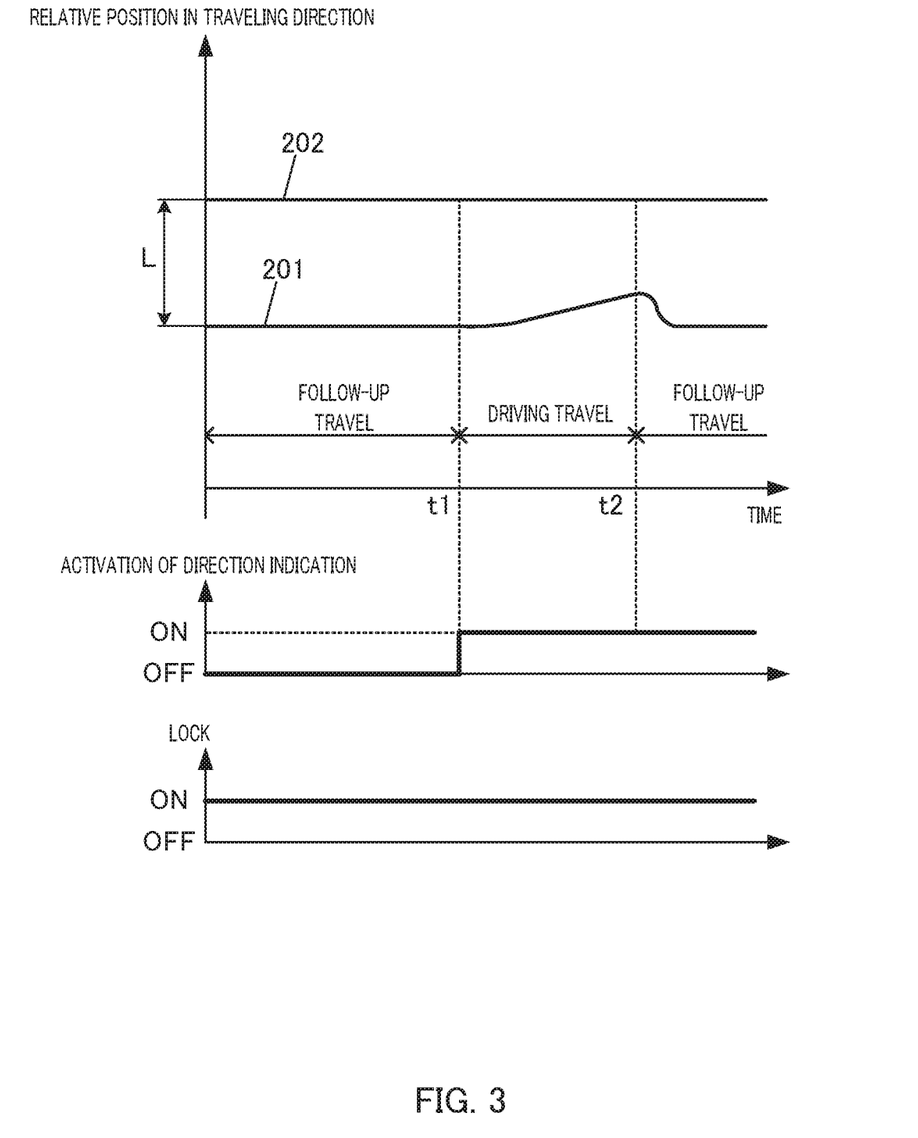
FIG. 3 is a time chart illustrating an example of the operation of travel control device.

Next, a specific example of the control for switching traveling of vehicle 1 will be described with reference to FIG. 3. FIG. 3 shows a temporal change in the relative position of vehicle 1 with solid line 201, and the temporal change in the relative position of the preceding vehicle with solid line 202. The distance between solid lines 201 and 202 represents inter-vehicle distance L between the vehicles.

Direction indication determination section 110 determines that a direction indication is activated according to the ON signal output at time t1 illustrated in FIG. 3.

Preceding vehicle identifying section 130 determines that there is a preceding vehicle according to a lock-on signal illustrated in FIG. 3.

Travel control section 120 performs a switching control for traveling of vehicle 1 from the follow-up travel to the driving travel when the vehicle satisfies a condition that it is determined that the direction indication is activated at time t1 illustrated in FIG. 3 and inter-vehicle distance L with respect to the preceding vehicle exceeds a predetermined distance during the follow-up travel. The predetermined distance here is an inter-vehicle distance ensuring safety when vehicle 1 passes the preceding vehicle, that is, a distance ensuring safety when it exceeds the predetermined distance.

As described above, when inter-vehicle distance L with respect to the preceding vehicle is greater than the predetermined distance, traveling of vehicle 1 is switched from the follow-up travel to the driving travel. In the driving travel, vehicle 1 is accelerated so as to keep the velocity of vehicle 1 to the target vehicle velocity. For example, the driver performs a steering operation so as to change from a traveling lane to a passing lane. Accordingly, vehicle 1 can pass the preceding vehicle due to the difference between the target vehicle velocity of vehicle 1 and the velocity of the preceding vehicle.

However, even when vehicle 1 is switched to the driving travel and vehicle 1 is accelerated, the driver may not perform the steering operation. In this case, since the difference between the target vehicle velocity of vehicle 1 and the velocity of the preceding vehicle causes vehicle 1 to approach the preceding vehicle and cannot sufficiently secure inter-vehicle distance L with respect to the preceding vehicle, the safety when vehicle 1 passes the preceding vehicle is lowered.

travel control section 120 performs a switching control for traveling of vehicle 1 from the driving travel to the follow-up travel when vehicle 1 satisfies a condition that it is determined that the direction indication is activated at time t2 illustrated in FIG. 3, that the preceding vehicle is identified, and that inter-vehicle distance L with respect to the preceding vehicle is less than the predetermined distance (which may be and may not be the predetermined distance during the follow-up travel described above) during the driving travel. The predetermined distance here is an inter-vehicle distance ensuring safety when vehicle 1 passes the preceding vehicle, that is, a distance that cannot guarantee safety when it is less than the predetermined distance.

Next, a description will be given of an example of the operation of travel control of travel control section 120.

Figure 4:
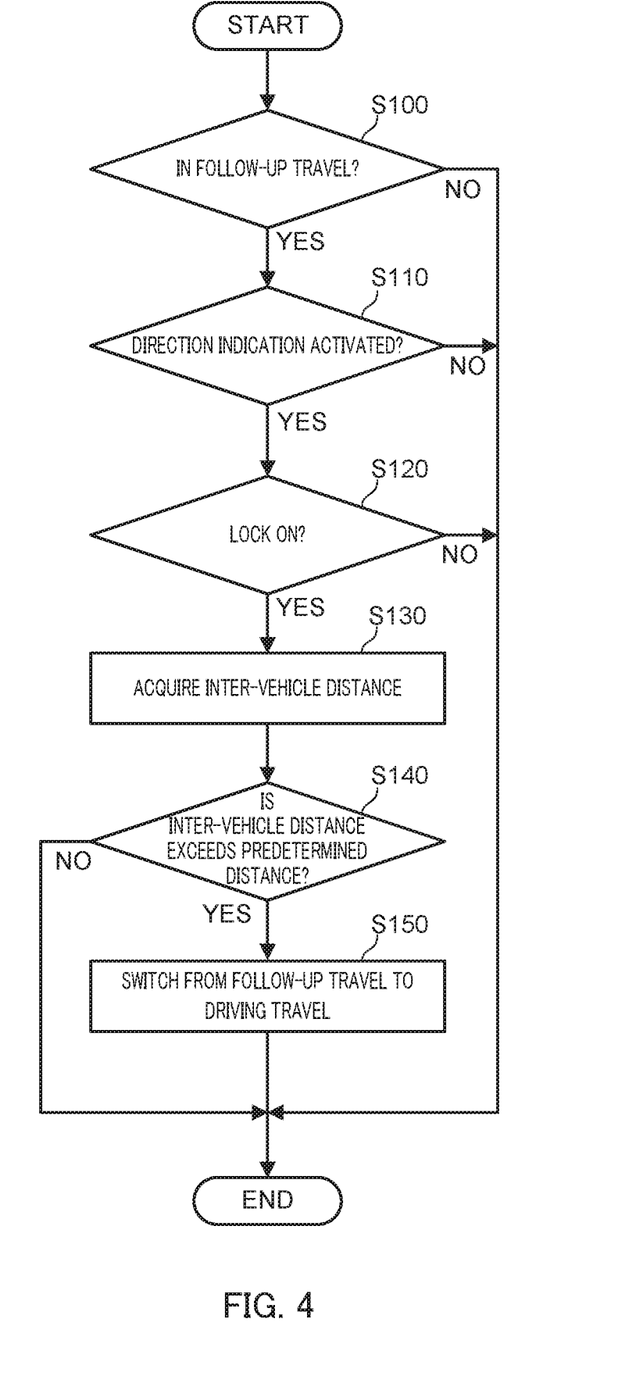
FIG. 4 is a flowchart illustrating an example of an operation of the travel control performed during the follow-up travel.

Next, a description will be given of an example of the operation of travel control during the follow-up travel. FIG. 4 is a flowchart illustrating an example of the operation of the travel control during the follow-up travel. The processing in FIG. 4 is carried out, for example, during traveling of vehicle 1.

As illustrated in FIG. 4, travel control section 120 determines whether or not the vehicle is in the follow-up travel (step S100). As a result of the determination, when it is determined that the vehicle is not in the follow-up travel (step S100: NO), the procedure ends. On the other hand, when the vehicle is in the follow-up travel (step S100: YES), the procedure proceeds to step S110.

In step S110, the travel control section 120 determines whether or not the direction indication is activated. When the direction indication is not activated (step S110: NO), the procedure ends. On the other hand, when the direction indication is activated (step S110: YES), travel control section 120 determines whether or not there is a preceding vehicle (step S120).

When there is no preceding vehicle (step S120: NO), the procedure ends. On the other hand, when there is a preceding vehicle (step S120: YES), travel control section 120 acquires an inter-vehicle distance (step S130).

Next, travel control section 120 determines whether or not the inter-vehicle distance exceeds a predetermined distance (step S140).

When the inter-vehicle distance is equal to or less than the predetermined distance (step S140: NO), the procedure ends. On the other hand, when the inter-vehicle distance exceeds the predetermined distance (step S140: YES), travel control section 120 performs a switching control for traveling of vehicle 1 from the follow-up travel to the driving travel (step S150).

Figure 5:
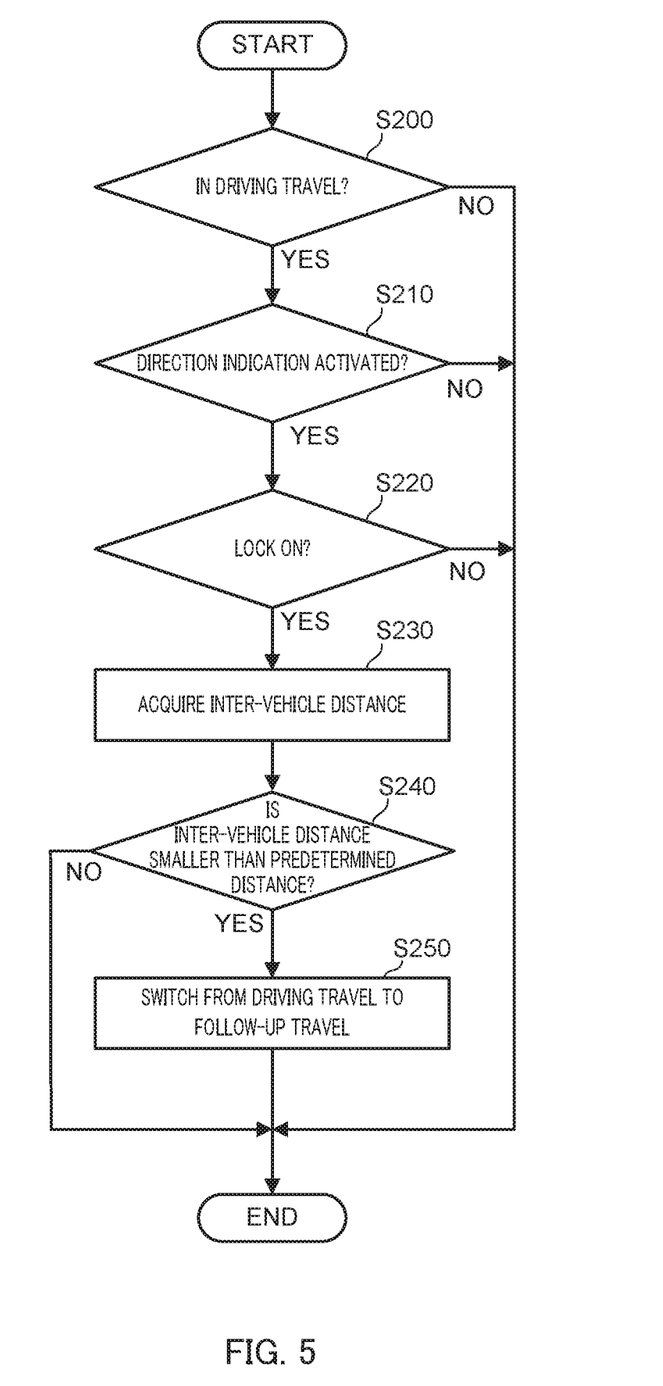
FIG. 5 is a flowchart illustrating an example of an operation of the travel control during the driving travel.

Next, an example of the operation of the travel control during the driving travel will be described. FIG. 5 is a flowchart illustrating an example of the operation of the travel control during the driving travel. The processing in FIG. 5 is carried out, for example, during traveling of vehicle 1.

As illustrated in FIG. 5, travel control section 120 determines whether or not the vehicle is in the driving travel (step S200). As a result of the determination, when the vehicle is not in the driving travel (step S200: NO), the procedure ends. On the other hand, when the vehicle is in the driving travel (step S200: YES), the procedure proceeds to step S210.

In step S210, travel control section 120 determines whether or not the direction indication is activated. As a result of the determination, when the direction indication is not activated (step S210: NO), the procedure ends. On the other hand, when the direction indication is activated (step S210: YES), travel control section 120 determines whether or not there is a preceding vehicle (step S220).

When there is no preceding vehicle (step S220: NO), the procedure ends. On the other hand, when there is a preceding vehicle (step S220: YES), travel control section 120 acquires an inter-vehicle distance (step S230).

Next, travel control section 120 determines whether or not the inter-vehicle distance is less than a predetermined distance (which may be or may not be the same as the predetermined distance in step S140 described above) (step S240).

When the inter-vehicle distance is equal to or greater than the predetermined distance (step S240: NO), the procedure ends. On the other hand, when the inter-vehicle distance is less than the predetermined distance (step S240: YES), travel control section 120 performs a switching control for traveling of vehicle 1 from the driving travel to the follow-up travel (step S250).

(Advantageous Effects of the Present Embodiments)

According to travel control device 100 of the present embodiment, travel control section 120 performs a switching control for traveling of vehicle 1 from the follow-up travel to the driving travel when the vehicle satisfies a condition that it is determined that the direction indication is activated, the preceding vehicle is identified, and inter-vehicle distance L exceeds the predetermined distance during the follow-up travel. Accordingly, vehicle 1 can be accelerated without being hindered by braking of vehicle 1, and since there is a sufficient inter-vehicle distance between vehicles when the vehicle passes the preceding vehicle, passing from the follow-up travel can be smoothly carried out while improving safety.

Further, according to travel control device 100 of the present embodiment, travel control section 120 performs a switching control for traveling of vehicle 1 from the driving travel to the follow-up travel when the vehicle satisfies a condition that it is determined that the direction indication is activated, the preceding vehicle is identified, and inter-vehicle distance L exceeds the predetermined distance during the driving travel. Accordingly, for example, when the inter-vehicle distance is insufficient, the vehicle is switched from the driving travel to the follow-up travel, so that the safety at the time when the vehicle passes the preceding vehicle can be increased.

Modified Example 1

Next, Modification 1 of the present embodiment will be described.

In the above embodiment, a predetermined distance that becomes a condition when vehicle 1 passes the preceding vehicle is constant regardless of the velocity of vehicle 1. However, this disclosure is not limited to this, and the predetermined distance may be set in accordance with the velocity of vehicle 1. Incidentally, the velocity of vehicle 1 is detected by vehicle velocity sensor 35.

Modified Example 2

It is to be noted that, in the embodiment described above, travel control section 120 performs a switching control for from the follow-up travel to the driving travel when the vehicle satisfies a condition that it is determined that the direction indication is activated, the preceding vehicle is identified, and inter-vehicle distance L exceeds a predetermined distance during the follow-up travel. However, this disclosure is not limited thereto, and when the condition described above is satisfied and the relative velocity in the separating direction of vehicle 1 relative to the preceding vehicle exceeds a predetermined velocity, the vehicle may perform a switching control for traveling from the follow-up travel to the driving travel. It is to be noted that the relative velocity in the separating direction of the vehicle with respect to the preceding vehicle can be calculated based on the change in the inter-vehicle distance measured by the inter-vehicle distance detecting section 140. By performing a switching control for from the follow-up travel to the driving travel based on the relative velocity in the separating direction, the inter-vehicle distance is sufficiently secured, so that it is possible to further enhance the safety when passing the preceding vehicle.

Modified Example 3

It is to be noted that, in the embodiment described above, travel control section 120 performs a switching control for from the driving travel to the follow-up travel when the vehicle satisfies a condition that it is determined that the direction indication is activated, the preceding vehicle is identified, and the inter-vehicle distance is less than a predetermined distance during the driving travel. However, this disclosure is not limited thereto, and a switching control for from the driving travel to the follow-up travel may be performed when the above described condition is satisfied and the relative velocity in the approaching direction of vehicle 1 with respect to the preceding vehicle exceeds a predetermined velocity (which may be and may not be the same as the predetermined velocity in the relative velocity in the separating direction). By performing a switching control for from the driving travel to the follow-up travel based on the relative velocity in the approaching direction, when the inter-vehicle distance is not sufficiently secured, the vehicle is switched from the driving travel to the follow-up travel, so that the safety at the time of passing the preceding vehicle can be further improved.

While specific embodiments of this disclosure have been described in detail above, these are merely illustrative and are not intended to limit the scope of the claims. The appended claims include various modifications and alterations to the specific embodiments described above.

This application is based on Japanese Patent Application No. 2017-057819, filed on Mar. 23, 2017, the contents of which are incorporated herein by reference.

INDUSTRIAL APPLICABILITY

This disclosure is useful as a travel control device for an automobile or the like, which is required to smoothly pass from the follow-up travel while improving safety.

REFERENCE SIGNS LIST 1 vehicle
2 automatic traveling device
3 engine
4 clutch
5 transmission
6 propulsion shaft
7 differential device
8 drive shaft
9 wheel
10 engine ECU
11 power transmission ECU
13 target vehicle velocity setting device
14 increase/decrease value setting device
20 road information acquisition device
21 current position acquisition device
22 weather acquisition device
23 ambient sensor
30 vehicle information acquisition device
31 accelerator sensor
32 brake switch
33 shift lever
34 turn signal switch
35 vehicle velocity sensor
40 braking device
41 foot brake
42 retarder
43 auxiliary brake
100 travel control device
110 direction indication determination section
120 travel control section
130 preceding vehicle identifying section
140 inter-vehicle distance detecting section

What is claimed is:

1. A travel control device, comprising:
   a direction indication determination circuit that determines whether or not a direction indication by a direction indicator of a vehicle is activated, based on a signal from the direction indicator;
   a travel control section that performs a switching control for traveling of the vehicle between a follow-up travel and a driving travel, the follow-up travel causing the vehicle to follow a preceding vehicle traveling in front of the vehicle so as to keep an inter-vehicle distance between the vehicle and the preceding vehicle at a target inter-vehicle distance and the driving travel causing the vehicle to travel so as to keep the velocity of the vehicle to a target vehicle velocity; and
   an inter-vehicle distance detecting section that detects the inter-vehicle distance between the vehicle and the preceding vehicle during the follow-up travel,
   wherein
   the travel control section switches traveling of the vehicle from the follow-up travel to the driving travel to pass the preceding vehicle when the vehicle satisfies a first condition that it has been determined that the direction indication is activated and that the inter-vehicle distance exceeds a predetermined distance, during the follow-up travel, the predetermined distance being set in advance, separately from the target inter-vehicle distance, based on a change in the inter-vehicle distance when the vehicle passes the preceding vehicle.

2. The travel control device according to claim 1, further comprising:
   a relative velocity detecting section that detects a relative velocity of the vehicle with respect to the preceding vehicle in a separating direction, wherein
   the travel control section switches traveling of the vehicle from the follow-up travel to the driving travel when the vehicle satisfies the first condition and the relative velocity in the separating direction exceeds a predetermined velocity.

3. The travel control device according to claim 2, wherein the travel control section switches traveling of the vehicle from the driving travel to the follow-up travel when the vehicle satisfies a second condition that it has been determined that the direction indication is activated, that the preceding vehicle is identified and that the inter-vehicle distance is less than a predetermined distance during the driving travel, and then switches traveling of the vehicle from the follow-up travel to the driving travel when the first condition is satisfied by the inter-vehicle distance exceeding the predetermined distance.

4. The travel control device according to claim 3, wherein the travel control section performs a switching control for traveling of the vehicle from the driving travel to the follow-up travel when the second condition is satisfied and the relative velocity in an approaching direction of the vehicle with respect to the preceding vehicle exceeds a predetermined velocity.

5. A vehicle, comprising the travel control device according to claim 1.

6. A travel control method, comprising:
   determining whether or not direction indication by a direction indicator of a vehicle is activated, based on a signal from the direction indicator;
   performing a switching control for traveling of the vehicle between a follow-up travel and a driving travel, the follow-up travel causing the vehicle to follow a preceding vehicle traveling in front of the vehicle so as to keep an inter-vehicle distance between the vehicle and the preceding vehicle at a target inter-vehicle distance and the driving travel causing the vehicle to travel so as to keep the velocity of the vehicle to a target vehicle velocity;
   detecting the inter-vehicle distance between the vehicle and the preceding vehicle; and
   switching traveling of the vehicle from the follow-up travel to the driving travel to pass the preceding vehicle when it has been determined that the direction indication is activated and that the inter-vehicle distance exceeds a predetermined distance during the follow-up travel, the predetermined distance being set in advance, separately from the target inter-vehicle distance, based on a change in the inter-vehicle distance when the vehicle passes the preceding vehicle.

* * * * *